United States Patent
Singh et al.

(10) Patent No.: US 10,771,188 B2
(45) Date of Patent: Sep. 8, 2020

(54) REDUCTION IN LATENCY FOR CELLULAR HANDOVER IN WEARABLE DEVICES

(71) Applicant: Apple Inc., Cupertino, CA (US)

(72) Inventors: Ajoy K. Singh, Milpitas, CA (US); Ashkan Heshmati, San Jose, CA (US); Faraz Faheem, Santa Clara, CA (US); Jianxiong Shi, Dublin, CA (US); Karthik Chockalingam, Santa Clara, CA (US); Murtaza A. Shikari, Mountain View, CA (US); Srinivasan Nimmala, San Jose, CA (US); Srirang A. Lovlekar, Cupertino, CA (US); Suresh Koppisetty, Santa Clara, CA (US); John Y. Su, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 15/996,181

(22) Filed: Jun. 1, 2018

(65) Prior Publication Data
US 2019/0372708 A1    Dec. 5, 2019

(51) Int. Cl.
| | |
|---|---|
| *H04L 1/00* | (2006.01) |
| *H04W 88/04* | (2009.01) |
| *H04W 76/19* | (2018.01) |
| *H04W 76/14* | (2018.01) |
| *H04W 4/80* | (2018.01) |

(52) U.S. Cl.
CPC .............. *H04L 1/0018* (2013.01); *H04W 4/80* (2018.02); *H04W 76/14* (2018.02); *H04W 76/19* (2018.02); *H04W 88/04* (2013.01)

(58) Field of Classification Search
None
See application file for complete search history.

(56) References Cited

U.S. PATENT DOCUMENTS

| | | | |
|---|---|---|---|
| 9,788,232 B2 | 10/2017 | Goldfain | |
| 10,470,160 B2 * | 11/2019 | Agiwal | H04W 68/02 |
| 2013/0045744 A1 * | 2/2013 | Dimpflmaier | H04W 52/0225 455/437 |
| 2014/0370863 A1 * | 12/2014 | Proctor, Jr. | G06Q 30/0601 455/414.3 |
| 2015/0312857 A1 * | 10/2015 | Kim | H04W 52/028 370/311 |
| 2015/0319660 A1 * | 11/2015 | Helbert | H04W 36/245 455/436 |
| 2016/0132287 A1 * | 5/2016 | Kotteri | G06F 9/44505 713/100 |
| 2016/0183193 A1 * | 6/2016 | Laffaye | H04W 52/0254 370/311 |

(Continued)

FOREIGN PATENT DOCUMENTS

WO    WO2018031799 A1    2/2018

*Primary Examiner* — Gregory B Sefcheck
(74) *Attorney, Agent, or Firm* — Kowert, Hood, Munyon, Rankin & Goetzel, P.C.

(57) ABSTRACT

An accessory device may establish a short range link to a companion device, and the accessory device may use the companion device as a proxy to conduct a data session over a cellular network. Based on a latency requirement associated with the data session and/or a signal strength of the short range link, the accessory device may dynamically determine to transition its cellular radio from a powered-off mode to a low power mode.

20 Claims, 7 Drawing Sheets

(56) References Cited

U.S. PATENT DOCUMENTS

| | | | |
|---|---|---|---|
| 2016/0203702 A1* | 7/2016 | Ruoping | G08B 25/10 |
| | | | 340/539.3 |
| 2016/0261996 A1* | 9/2016 | Malik | H04W 4/90 |
| 2016/0262094 A1* | 9/2016 | Khay-Ibbat | H04W 72/048 |
| 2017/0055195 A1* | 2/2017 | Ingale | H04W 48/18 |
| 2017/0064752 A1 | 3/2017 | Veikkolainen | |
| 2017/0070919 A1* | 3/2017 | Verger | H04W 76/23 |
| 2018/0368101 A1* | 12/2018 | Agiwal | H04W 68/00 |
| 2018/0376317 A1* | 12/2018 | Kim | H04L 63/102 |
| 2019/0082496 A1* | 3/2019 | Yi | H04W 68/02 |
| 2019/0364492 A1* | 11/2019 | Azizi | H04W 24/08 |

\* cited by examiner

REDUCTION IN LATENCY FOR CELLULAR HANDOVER IN WEARABLE DEVICES

TECHNICAL FIELD

The present application relates to wireless communication, including to techniques for seamlessly performing cellular handover for an accessory or wearable device.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices while also improving user experience. Therefore, improvements in the field are desired.

SUMMARY

Embodiments are presented herein of, inter alia, systems, apparatuses, and methods for dynamic mode selection for a user equipment device (UE) and an accessory wireless device.

The accessory wireless device may be a link budget limited device, such as an accessory device with a relatively limited communication range, e.g., due to device design constraints. Additionally, or alternatively, battery power may be a limited resource for the accessory wireless device, such that managing the power consumption resulting from cellular service operations may be desirable.

In some embodiments, an accessory device may utilize a companion device as a proxy device to establish a data session with a network entity over a cellular network. The accessory device (AD) may preemptively boot up its cellular radio from a powered-off mode to a low power mode based on a determination that a latency requirement of the data session is shorter than a predetermined latency threshold of the AD.

The latency requirement may be related to a streaming buffer length of the data session (for embodiments where the data session is a streaming data session), or may be based on other timeout values associated with the data session. The predetermined latency threshold may be based on an amount of time required to boot up the cellular radio of the AD and reestablish the data session using the cellular radio of the AD (i.e., perform cellular handover).

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
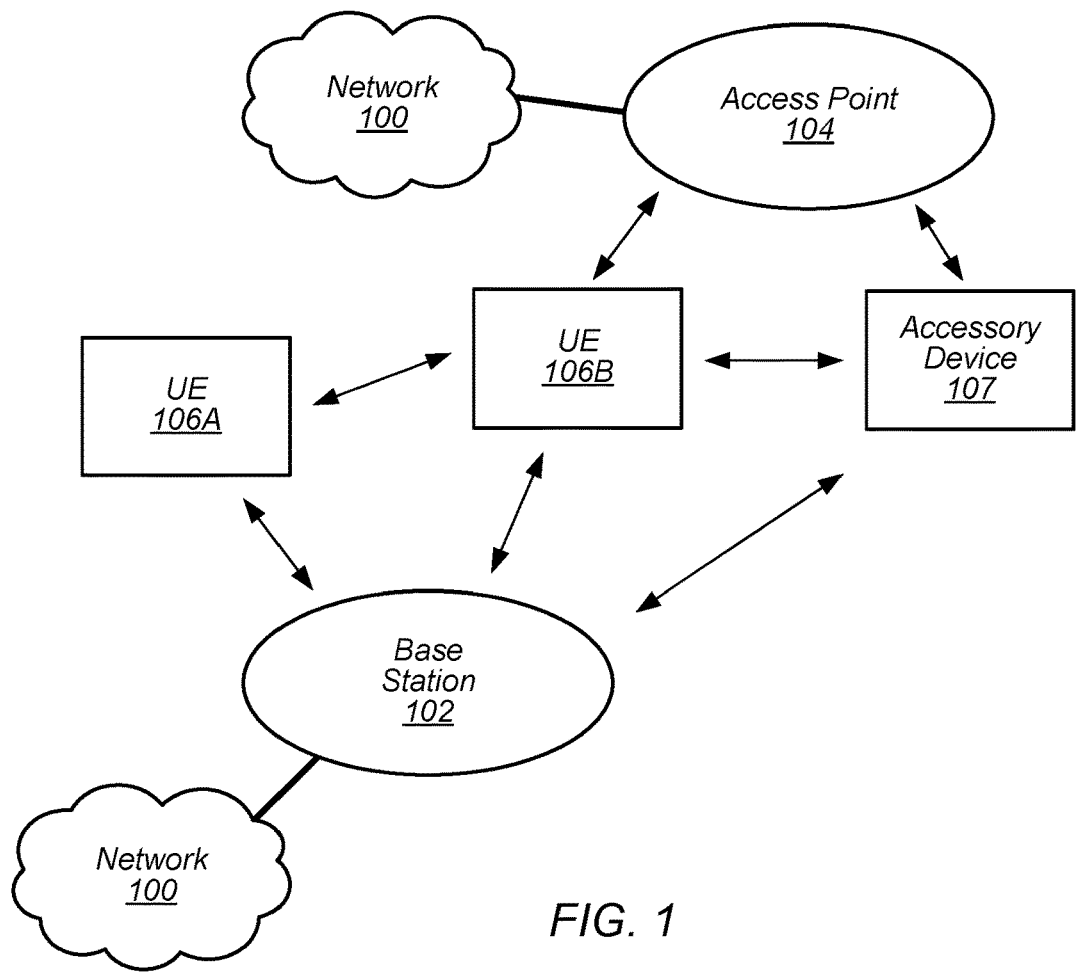
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication. A UE may serve as a companion device for an accessory or wearable device.

Wireless Device—any of various types of computer system devices which performs wireless communications. A wireless device can be portable (or mobile) or may be stationary or fixed at a certain location. A UE and a wearable or other accessory device are examples of wireless devices. A UE may serve as a Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
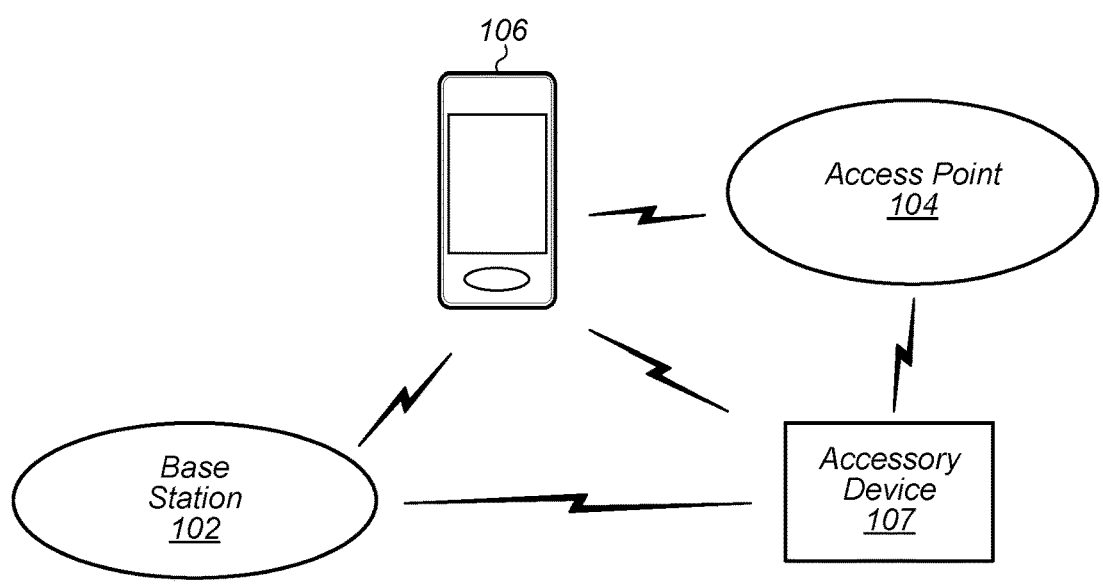
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

As shown, the exemplary wireless communication system also includes a Wi-Fi access point 104, which communicates over a transmission medium with the wireless device 106B as well as accessory device 107. The Wi-Fi Access point also provides communicative connectivity to the network 100. Thus, according to some embodiments, wireless devices may be able to connect to either or both of the base station 102 (or another cellular base station) and the access point 104 (or another access point) to access the network 100 at a given time.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100, and/or may prioritize access to the network 100 obtained via the access point 104. In other words, the accessory device 107 may selectively use the cellular communication capabilities of its companion device (e.g., UE 106B) and/or its Wi-Fi communication capability to conduct its communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may have cellular communication capability and be capable of directly communicating with the base station 102, as shown. FIG. 2 also illustrates the accessory device 107 in communication with access point 104. The accessory device 107 may also have Wi-Fi communication capability and be capable of directly communicating with the access point 104, as shown.

The accessory device 107 may also be capable of communicating with another device (e.g., UE 106), referred to as a proxy device, intermediate device, or companion device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102 and/or access point 104. In other words, the accessory device 107 may provide voice/data packets intended for the base station 102 or access point 104 over the short range link to the UE 106, and the UE 106 may use its cellular or Wi-Fi functionality to transmit (or relay) this voice/data to the base station/access point on behalf of the accessory device 107. Similarly, the voice/data packets transmitted by the base station/access point and intended for the accessory device 107 may be received by the cellular/Wi-Fi functionality of the UE 106 and then may be relayed over the short range link to the accessory device. As noted above, the UE 106 may be a mobile phone, a tablet, or any other type of hand-held device, a media player, a computer, a laptop or virtually any type of wireless device.

At least in some instances, the accessory device 107 may also or alternatively selectively utilize one or the other of cellular or Wi-Fi communication capability to communicate directly with a cellular base station or a Wi-Fi access point, e.g., even if both options may be available. For example, if both wireless link options are available and are capable of providing the communication services currently desired by the accessory device 107, the accessory device 107 might prioritize the Wi-Fi link, e.g., to potentially reduce device power consumption and/or if the Wi-Fi link is considered to have a lower economic cost. As described further subsequently herein, the UE 106 and/or the accessory device 107 may manage the wireless connectivity of the accessory device 107 in accordance with any of a variety of additional or alternative considerations at various times.

The UE 106 and/or 107 may include a device or integrated circuit for facilitating cellular communication, referred to as a cellular modem 334. The cellular modem may include one or more processors (processor elements) and various hardware components as described herein. The cellular modem may comprise a cellular baseband and/or cellular baseband processor that may be powered on or off depending on whether cellular activity is to be performed. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in an accessory device as defined herein, a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited cellular communication capabilities). Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs, and/or may otherwise selective utilize its wireless communication capabilities. As previously noted, when the UE 106 is capable of being used by the accessory device 107 as a proxy, the UE 106 may be referred to as a companion device to the accessory device 107.

Figure 3:
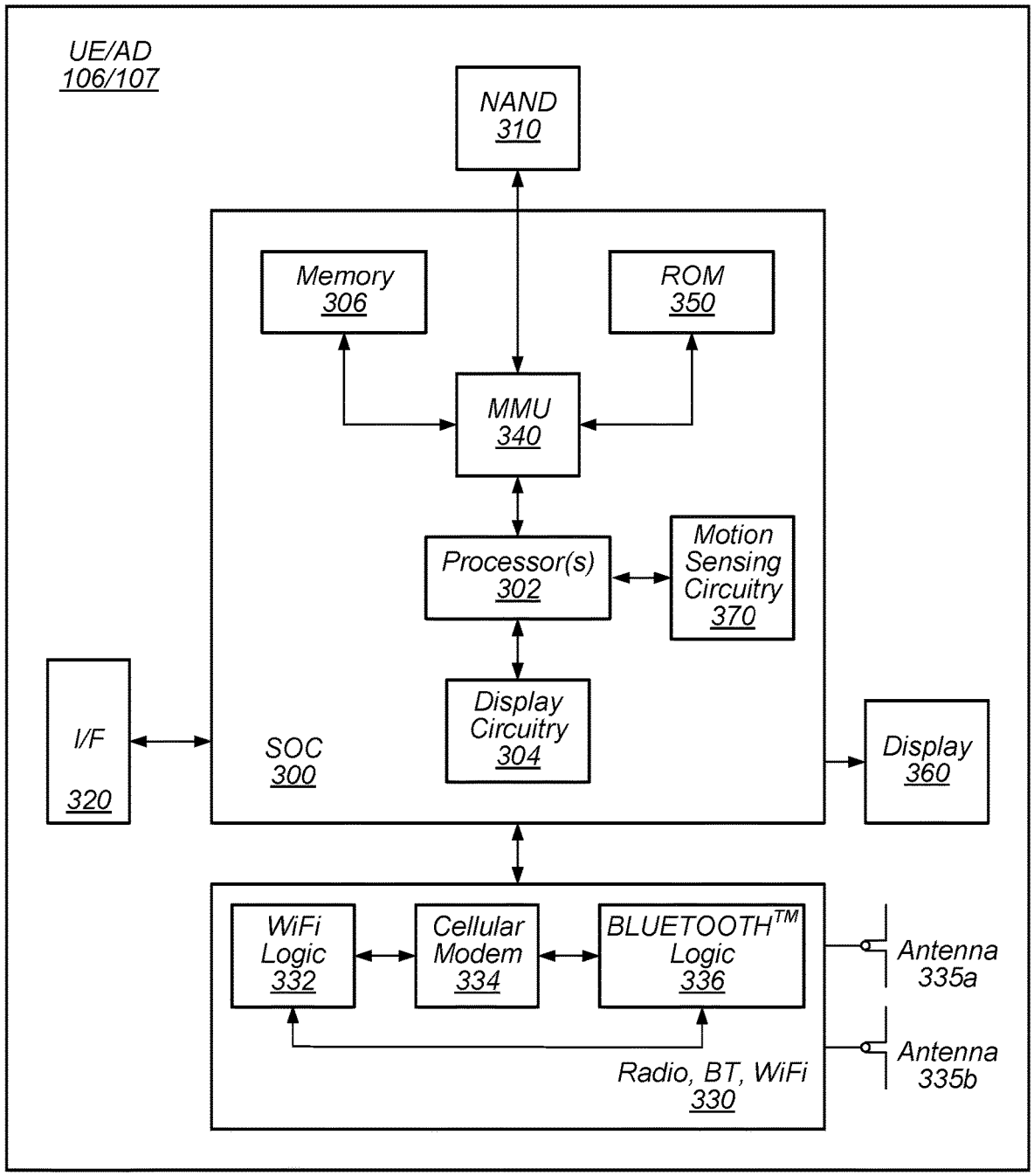
FIG. 3 is a block diagram illustrating an example accessory device or companion device, according to some embodiments.

FIG. 3—Example Block Diagram of a UE or Accessory Device

FIG. 3 illustrates one possible block diagram of an UE device, such as UE device 106 or accessory device (AD) 107. As shown, the device 106/107 may include a system on chip (SOC) 300, which may include portions for various purposes. For example, as shown, the SOC 300 may include processor(s) 302 which may execute program instructions for the device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The wireless device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE/AD 106/107 may include hardware and software components for implementing embodiments of this disclosure. For example, one or more components of the wireless communication circuitry 330 (e.g., Wi-Fi logic 332, cellular modem 334, Bluetooth logic 336) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
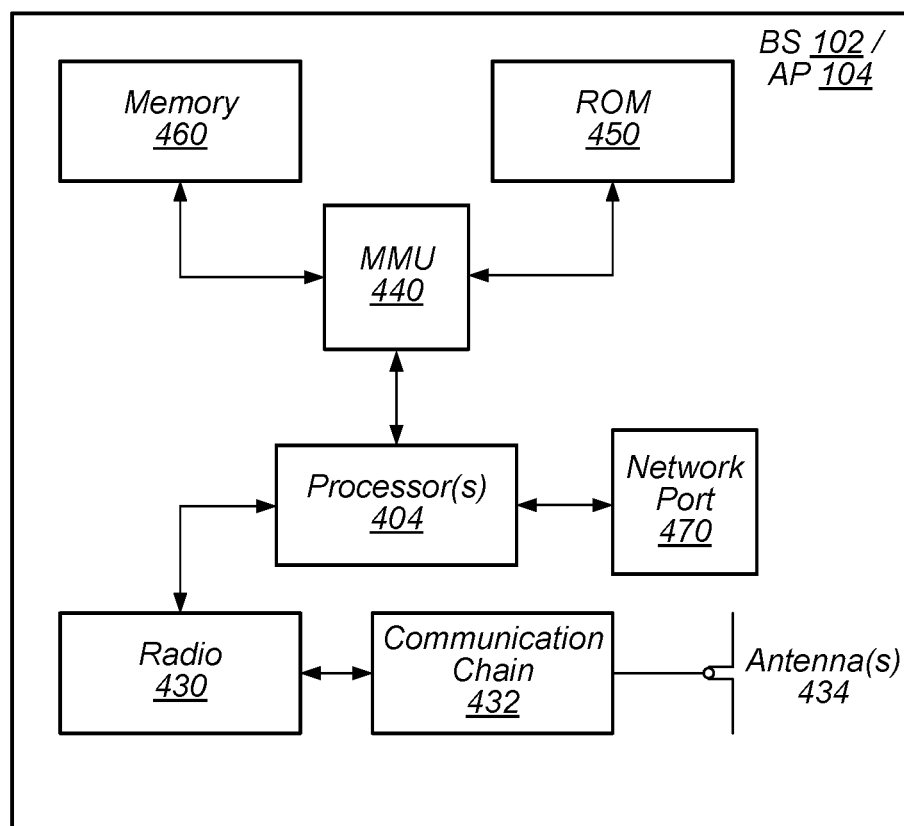
FIG. 4 is a block diagram illustrating an example base station and access point, according to some embodiments.

FIG. 4—Block Diagram of a Base Station

FIG. 4 illustrates an example block diagram of a base station 102 or access point 104, according to some embodiments. It is noted that the base station of FIG. 4 is merely one example of a possible base station. As shown, the base station 102/access point 104 may include processor(s) 404 which may execute program instructions for the base station 102/access point 104. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102/access point 104 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102/access point 104 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102/access point 104 may be configured to communicate wirelessly using multiple wireless communication standards. In some instances, the base station 102 may include multiple radios, which may enable the base station 102 to communicate according to multiple wireless communication technologies. For example, as one possibility, the base station 102/access point 104 may include an LTE radio for performing communication according to LTE as well as a Wi-Fi radio for performing communication according to Wi-Fi. In such a case, the base station 102/access point 104 may be capable of operating as both an LTE base station and a Wi-Fi access point. As another possibility, the base station 102/access point 104 may include a multi-mode radio which is capable of performing communications according to any of multiple wireless communication technologies (e.g., LTE and Wi-Fi, LTE and UMTS, LTE and CDMA2000, UMTS and GSM, etc.). As still another possiblity, the base station 102/access point 104 may be configured to act exclusively as a Wi-Fi access point, e.g., without cellular communication capability.

As described further subsequently herein, the BS 102/AP 104 may include hardware and software components for implementing or supporting implementation of features described herein. The processor 404 of the base station 102/access point 104 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102/AP 104, in conjunction with one or more of the other components 430, 432, 434, 440, 450, 460, 470 may be configured to implement or support implementation of part or all of the features described herein.

Hardware Limitations of Accessory Devices

Accessory devices (e.g., wearable devices) are typically smaller in form factor and hence may be resource constrained. For example, accessory devices may have limited battery, CPU and memory resources. Often, wearable devices are used as an accessory device to a companion device such as a smart phone or other user equipment device (UE), and hence it may be desirable for the accessory device (AD) and the UE to have comparable battery life. Even though accessory devices may support multiple radios (e.g., Bluetooth (BT), WiFi and Baseband (Cellular, WWAN connectivity)), to preserve power, an AD may switch off its cellular radio and utilize a short range wireless link with its companion UE while the AD is in the proximity of the companion UE. For example, a Bluetooth (BT) radio of the AD may consume less power than its cellular radio, and the AD may save power by establishing a cellular connection through the UE (i.e., using the UE as a proxy device), rather than by using its cellular radio. In other words, the AD may utilize its BT radio to establish a connection with the UE, and the AD may use the UE as a proxy to establish a connection with a cellular network. For example, a smartwatch may use a smartphone as a proxy for any network connectivity and may typically keep its cellular baseband (BB) processor (e.g., the cellular modem 334) switched off while the AD is connected via Bluetooth to the UE.

Utilizing a short range link with a companion device (and not powering on the cellular radio of the AD) may preserve battery life for the AD, but at the same time, it may introduce performance issues in certain circumstances. For example, a user of the AD may walk out of BT coverage of the UE while using a real-time music streaming application, or while using a virtual assistant (e.g., SIRI™, Alexa™, or Cortana™, or another virtual assistant). In these scenarios, the performance impact on an ongoing connection may be noticeable and may lead to a poor user experience. For example, a user of the AD may observe an audio glitch during music streaming when the user walks away from proximity of the companion UE because booting up the cellular BB to reestablish the streaming session over the AD's cellular radio may prevent the music stream from resuming over the cellular radio in a timely manner. If the cellular BB is powered on only after Bluetooth proximity link is no longer functional (to conserve power, baseband is turned OFF), it takes time for the cellular BB to boot-up (e.g., download image, setup communication with streaming application) bring up the appropriate data interface (e.g., find service, register with network and obtain IP connectivity)

For example, the delay involved in booting up a cellular radio to resume a data session may predominantly comprise the following components: the BB boot up delay, the low power mode (LPM) to online transition delay, and the public data network (PDN) activation delay. In different embodiments, other durations of each of these delays, as well as additional types of delays may be incurred in booting up a cellular radio. In exemplary embodiments, a large proportion of the delay may be incurred during the bootup of the BB of the cellular radio. Embodiments herein propose methods and devices for selectively and proactively booting up the cellular radio of an AD to a low power mode (LPM) and/or an active radio mode during a data session to improve the user experience. For example, the time required to transition the cellular radio from LPM to an active online cellular connection may be significantly less than that required to transition from a powered-off mode to the active online connection.

For example, the cellular BB of the AD may typically operate in a powered-off mode by default when the AD is connected to a companion device via a short range link. As described in greater detail below, the AD may transition the cellular radio from the powered-off mode to the LPM based on various considerations. As described herein, transitioning the cellular radio from powered-off mode to the LPM may be understood to involve booting up the baseband of the cellular radio.

Alternatively, the LPM may be an enhanced low power mode (eLPM), as described in greater detail below. As described herein, the eLPM may be a state that in steady state will consume the same power as traditional LPM, but that offers connectivity that is closer to a full online mode. While in eLPM, the AP may exploit the P2P short range link with the companion device to get different kinds of information to allow it to bring up the internet protocol (IP) interface quickly and reduce data stalls experienced by the user. The AD may utilize this information because the cellular carrier on the accessory device is the same as that of its companion device. Advantageously, since the cellular BB of the AD is already booted up (and potentially even registered with the network), there may be reduced latency for reestablishing the data session through the cellular radio.

According to various embodiments, different types of data may be shared between the AD and the companion device over the short range link in the eLPM. Some examples of data shared over the P2P link may include 1) a serving cell of the companion device is updated to the AD each time it changes on the companion device (due to cell re/selection or handovers), 2) information on strong neighboring cells, 3) system information blocks (SIBs) of the serving cell of the companion device, and 4) tracking area (TA) (or Routing Area (RA), Location Area (LA) and other registration boundaries in their respective Radio Networks) information if the companion device moves across TA boundaries (or if TA timer expired and the companion device performs a TA update with the network).

As described in greater detail below, in some embodiments, when the AD is about to start a user facing application/traffic such as a virtual assistant or radio streaming, the cellular baseband may be put into the enhanced LPM mode. In these embodiments, the AD may utilize the last serving cell information of the companion device to perform a quick cell search, camp (e.g., using system information provisioned by the companion device) and register onto the network (the AD may temporarily be in full online mode to perform this registration). Once registration is complete, the AD may be put back into LPM so as to consume reduced power expenditure. If the companion device has moved across TA (or RA, LA, etc.) boundaries (or alternatively, if a periodic TA/LA/RA timer expires) during the data session (information specifying this movement may have been received by the AD over the P2P link), the AD may optionally be temporarily brought back into online mode, camp onto the latest cell, and perform a TA/LA/RA registration (rather than a full registration). The device may go back to LPM immediately after completion of this procedure. This may advantageously maintain the registration with the network, reducing the time required in a potential subsequent reestablishment of the data session through the cellular radio of the AD (e.g., in the case of a loss of the BT connection with the companion device).

Alternatively, in some embodiments methods described herein may be employed by an AD configured in a commercial mobile alert service (CMAS) mode (e.g., in cases where a companion device is not nearby as described previously). For example, in some cases such as when WiFi is available (and WiFi calling is enabled) the cellular baseband may be powered up in a lower power consuming CMAS mode (this is a special mode of the cellular baseband, where the cellular baseband continues to be able to read the cellular configuration from networks to maintain emergency services but is restricted from performing transmissions to the network). If it had registered on a network prior to entering CMAS mode, it may allow the AD to maintain pseudo connectivity with the network in a good percentage of cases (e.g., where the AD has not moved beyond tracking area boundaries, or the TA Timer has not expired). In these cases, if WiFi is lost, the cellular baseband may power up in normal mode. In these embodiments, the AD may temporarily switch from CMAS mode to online mode to perform TA updates with the network on TA timer expiry, to maintain registration with the network.

In exemplary embodiments, the proactive booting up of the cellular BB may be performed selectively such as to not adversely affect the battery life of the accessory device to a significant degree. In various embodiments, the data session may comprise one or more streaming data sessions (e.g., one or more audio or video streaming sessions) and/or a virtual assistant data session (e.g., SIRI™, Alexa™, or Cortana™, among other possibilities).

Figure 5:
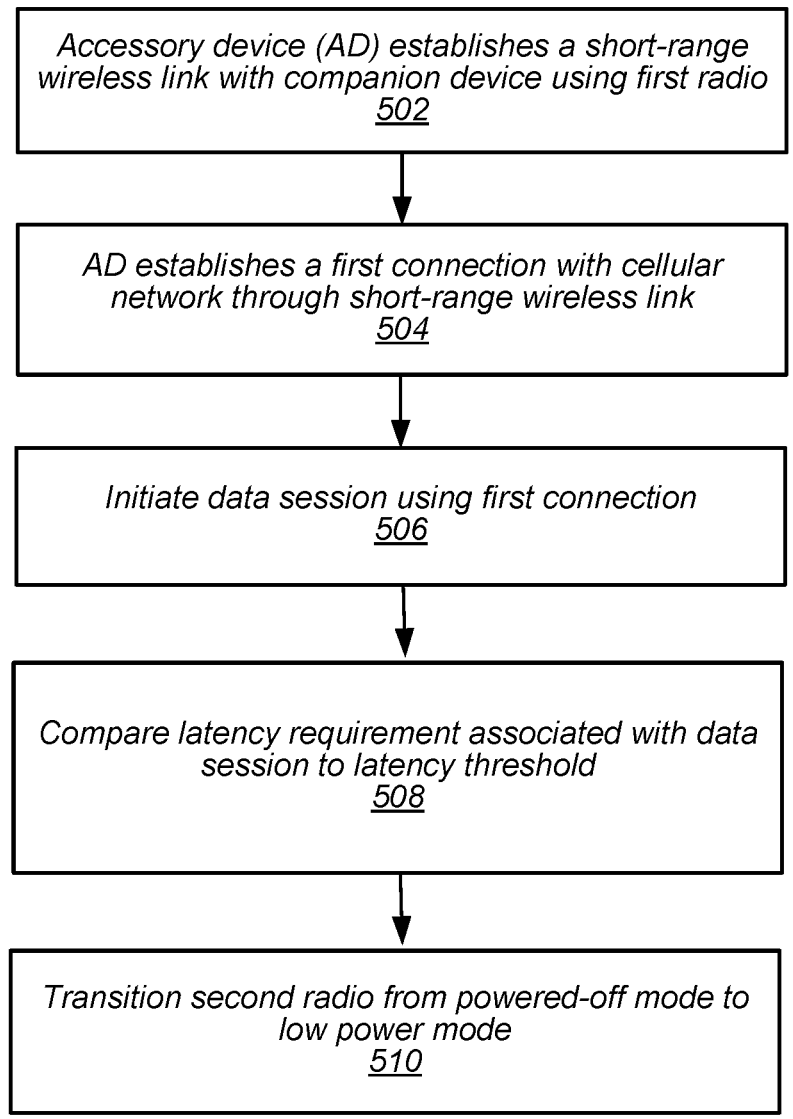
FIG. 5 is a flowchart diagram illustrating a method for preemptively transitioning a cellular radio of an accessory device to a low power mode (LPM), according to some embodiments.

FIG. 5—Flowchart for Proactive Low Power Mode

FIG. 5 is a flowchart diagram illustrating a method for selectively and proactively transitioning a cellular radio of an accessory device to a low power mode (LMP), according to some embodiments. In some embodiments, an inter radio access technology (iRAT) manager of the AD may serve to control the cellular BB power status of the AD, and direct the power status of the cellular radio according to the method steps described below. In other words, embodiments described herein for selectively and proactively transitioning a cellular radio between a powered-off mode, a low power mode, and/or an active online mode may be controlled by an iRAT manager of the AD. In various embodiments, some of the elements of the methods shown may be performed concurrently, in a different order than shown, may be substituted for by other method elements, or may be omitted. Additional method elements may also be performed as desired. As illustrated, the method may operate as follows.

At 502, the accessory device (AD) may establish a short-range wireless link with companion device using a first radio. The short-range wireless link may employ a first non-cellular radio access technology (RAT) such as Bluetooth. The companion device may be a UE such as a smart phone or another type of companion device.

At 504, the AD may establish a first connection with the cellular network through the short-range wireless link. For example, the AD may use the companion device as a proxy, whereby the AD utilizes the cellular radio of the companion device to communicate with a network entity over a cellular RAT.

At 506, the AD may initiate a data session with a network entity using the first connection. In various embodiments, the data session may be an audio or video streaming session, multiple streaming sessions, or a virtual assistant data session. Upon initiating the data session and/or during the data session, the AD may receive information from the network entity specifying details of the data session. As one example, the network entity may notify the AD of one or more types of information in a XPC status update message or another type of message. For example, the information regarding the data session may specify the status of network playback (e.g., whether data streaming has started or ended), an expected latency requirement of the data session (e.g., the network entity may indicate the expected time in seconds that playback may survive a network loss without impacting user experience), a playback session identifier (e.g., a unique identifier of a music session), or whether a media stall or media error has occurred during streaming.

For example, the AD may receive a latency requirement from the network entity that specifies a degree of latency in the first connection that may result in an adverse or noticeable interruption to the data session. For example, a music streaming session may transmit music data in discrete sequential segments, wherein each segment contains data for 15 seconds (or another duration) of the music stream. In this example, the AD may be able to experience 15 seconds of network latency before a noticeable interruption may occur to the music stream. Other examples are also possible.

At 508, the AD may compare the latency requirement associated with the data session to a predetermined latency threshold. The predetermined latency threshold may be determined based on an amount of time required to boot up the cellular radio of the AD and reestablish the cellular connection using the AD's cellular radio. In the event that the short range link between the AD and the companion device is lost or interrupted (e.g., if the accessory device moves out of range of the companion device), the AD may attempt to reestablish the first connection using the cellular radio of the AD. If the time required to boot up a baseband of the cellular radio and reestablish the first connection using the cellular radio is larger than the latency requirement associated with the data session, the process of reestablishing the first connection using the cellular radio may cause an interruption to the data session that may harm the user experience (e.g., the audio stream may be temporarily interrupted, or the virtual assistant may be unresponsive). Accordingly, it may be desirable to preemptively transition the cellular radio from a powered-off mode to a low power mode (e.g., to boot up the cellular baseband, or to enter an enhanced low power mode, according to various embodiments) if it is determined that the amount of time required to boot up the cellular radio and reestablish the cellular connection is greater than the latency requirement associated with the data session.

At 510, the AD may transition the cellular radio from a powered-off mode to a low power mode based at least in part on a determination that the latency requirement is shorter than the latency threshold. For example, if it determined that the latency requirement is shorter than the latency threshold, a loss of the connection of the short range link between the AD and the companion device may result in a noticeable interruption of the data session before the AD has time to power on the baseband of its cellular radio and reestablish the data session with the network entity. To address this potential issue, the AD may transition the cellular radio from the powered-off mode to the low power mode, thus reducing the time required to reestablish the data session (e.g., by removing the time required to power on the cellular BB) if a short range link loss occurs. Reestablishment of the data session over the cellular radio of the AD may be accomplished in a shorter amount of time, such that the data session is not noticeably interrupted or otherwise adversely affected.

In some embodiments, the data session may be an audio or video streaming data session. In these embodiments, the decision to transition the cellular BB of the AD from a powered off mode to a low power mode may be based on a size and a type of a music streaming buffer. In other words, the latency requirement may be based on a streaming buffer length of the streaming data session. For example, HTTP Live Streaming (HLS) may operate according to a shorter streaming buffer length than a streaming podcast, and the bootup time of the cellular BB may be more likely to result in adverse user experience for HLS than podcast streaming. The AD may therefore, as one nonlimiting example, elect to transition the cellular radio to LPM during HLS but not during podcast streaming.

In some embodiments, the data session may be operating in association with a plurality of audio and/or video streaming applications. For example, a user may be streaming music while conducting a video call, among other possibilities. In these embodiments, each of the audio and/or video streams may have a respective streaming buffer length, and the decision to transition the cellular radio to a LPM may be performed based on a comparison of the shortest buffering time of the respective streaming buffer lengths.

In some embodiments, AD may transition the cellular radio from a powered-off mode to a low power mode based at least in part on an application type that is utilizing the data session. For example, the AD may identify that certain application types (e.g., Spotify™ or another music streaming application) are associated with a sufficiently small latency requirement such that a preemptive transition of the cellular radio to LPM may be desirable.

In some embodiments, the AD may determine that the first data session comprises a latency sensitive critical user activity, such as a virtual assistant data session. In these embodiments, the AD may transition the cellular radio from the low power mode to an active radio mode (i.e., a full online mode with complete registration and/or reachability to the cellular network) based at least in part on the determination that the first data session comprises the virtual assistant data session. Alternatively, the AD may directly boot up the cellular radio to an online radio mode based on determining that the first data session comprises a latency sensitive critical user activity (i.e., the AD may not separately transition its cellular radio to LPM before transitioning to online radio mode). Because virtual assistants are typically used for relatively short periods of time (e.g., to answer a particular question or perform a particular task), the extra energy expenditure required to transition the cellular radio to an active radio mode may be smaller than for audio or video streaming. Additionally, a user may desire a low latency response time for using a virtual assistant. Fully powering the cellular radio in response to determining that a virtual assistant data session is being performed (and, possibly additionally in response to one or more other conditions and factors as described below) may significantly reduce the response latency experienced by the user without significantly increasing energy expenditure. The virtual assistant data session may continue to use the BT link with the companion device, and may fallback to cellular when it stops receiving a response over the BT link, or alternatively the AD may proactively command a data session to switch from BT to a cellular link when quality of the BT link degrades. The AD may make this determination based on each of the radio qualities of the cellular and BT links. Advantageously, a user may experience seamless virtual assistant performance when the user walks away from the companion device.

In some embodiments, the AD may transition its cellular radio from a powered-off mode to a low power mode further based at least in part on a determination that the quality of the BT signal is marginal. For example, the AD may only transition its cellular radio to the LPM if it determines that the latency requirement is shorter than the latency threshold and that the BT signal strength has fallen below a predetermined and/or configurable threshold (e.g., RSSI<−50 dBM or another threshold). Advantageously, power may not expended through powering the cellular radio when the BT signal is strong, and it is unlikely that the proxy connection through the companion device will be lost.

In some embodiments, the AD may have an allocated power budget for the proactive BB bootup feature to ensure that a power budget of the AD is not exceeded. For example, the AD may allocate a predetermined amount of power budget to use for powering the cellular BB in LPM during a configurable period of time (e.g., per day). Alternatively, the AD may reset the power budget each time the AD has its battery recharged. For example, an application associated with the iRAT (or another processing entity directing the preemptive LPM behavior) may create a running counter of the power already expended by running the cellular BB in LPM to reduce connectivity blackouts by using a model and power adders. The cellular BB may feed in its state variables (e.g., connection durations, signal conditions, TX power, BB state such as online/out of service/cmas etc.) to the application and allow the application to model power usage for LPM when the cellular BB is brought online. To avoid excessive power expenditure, the AD may only transition the cellular BB to LPM if, in addition to the one or more factors described above (e.g., the latency requirement comparison and/or the BT signal strength) the power budget has not been used already during a configurable period of time. Alternatively, the AD may only transition the cellular BB to LPM if, in addition to the one or more factors described above, the battery level of the AD is above a predetermined battery life threshold.

In some embodiments, in addition to one or more of the factors described above (e.g., latency requirement comparison, BT signal strength, and/or power budget used), the AD may trigger the cellular BB to transition to LPM mode when network playback is started, and/or when a streaming stall is detected. For example, the AD may receive a notification from the network entity that network playback has been initiated, and this notification may serve as an additional condition to trigger the transition of the cellular radio to LPM. Additionally, or alternatively, the AD may detect that a stall has occurred in the data session, and this detection may additionally serve as a condition to transition the cellular radio to LPM.

In some embodiments, after transitioning the cellular radio to a LPM, the AD may immediately transition the cellular radio from LPM mode to an online mode when a BT link loss is detected. For example, if the BT link is lost, the AD may immediately and automatically transition its cellular radio to a fully online mode, and it may utilize the cellular radio to reestablish the data session through the connection with the network entity. Because the cellular radio had already been partially powered on (i.e., placed in a LPM), the time required to reestablish the data session may be reduced and the user experience may be improved. Additionally or alternatively, the AD may trigger the cellular BB to enter the fully active online mode (i.e., a mode wherein the cellular radio establishes a connection with the network entity) when a media error is detected and/or when power budget is available.

In some embodiments, the AD may trigger the cellular BB to switch to the powered-off mode (either from the LPM mode or from the fully online mode) as soon as the AD is notified that the data session is completed (e.g., when a media stop event is received from the network entity). In some embodiments, the AD may wait a predetermined period of time (e.g., 30 seconds or another period of time) after the data session is completed before powering off the cellular BB. For example, if the data session is an audio data session, the AD may wait a predetermined period after completion of the audio streaming session (e.g., after completion of the song, album, or playlist), in case the user selects to initiate a subsequent audio streaming session. Waiting for the predetermined period of time before powering off the cellular baseband may supply a hysteresis effect, whereby a rapid transition of the cellular baseband from on, to off, and to on again may be avoided.

In exemplary embodiments, the described method steps 502-510 may be advantageously employed when the AD does not have access to a wireless local area network (WLAN) such as WiFi. For example, if a WiFi access point is available to the AD, the AD may forego method steps 502-510, since the AD may simply fallback to the WiFi access point to resume a data session upon loss of a BT link to a companion device.

Figure 6:
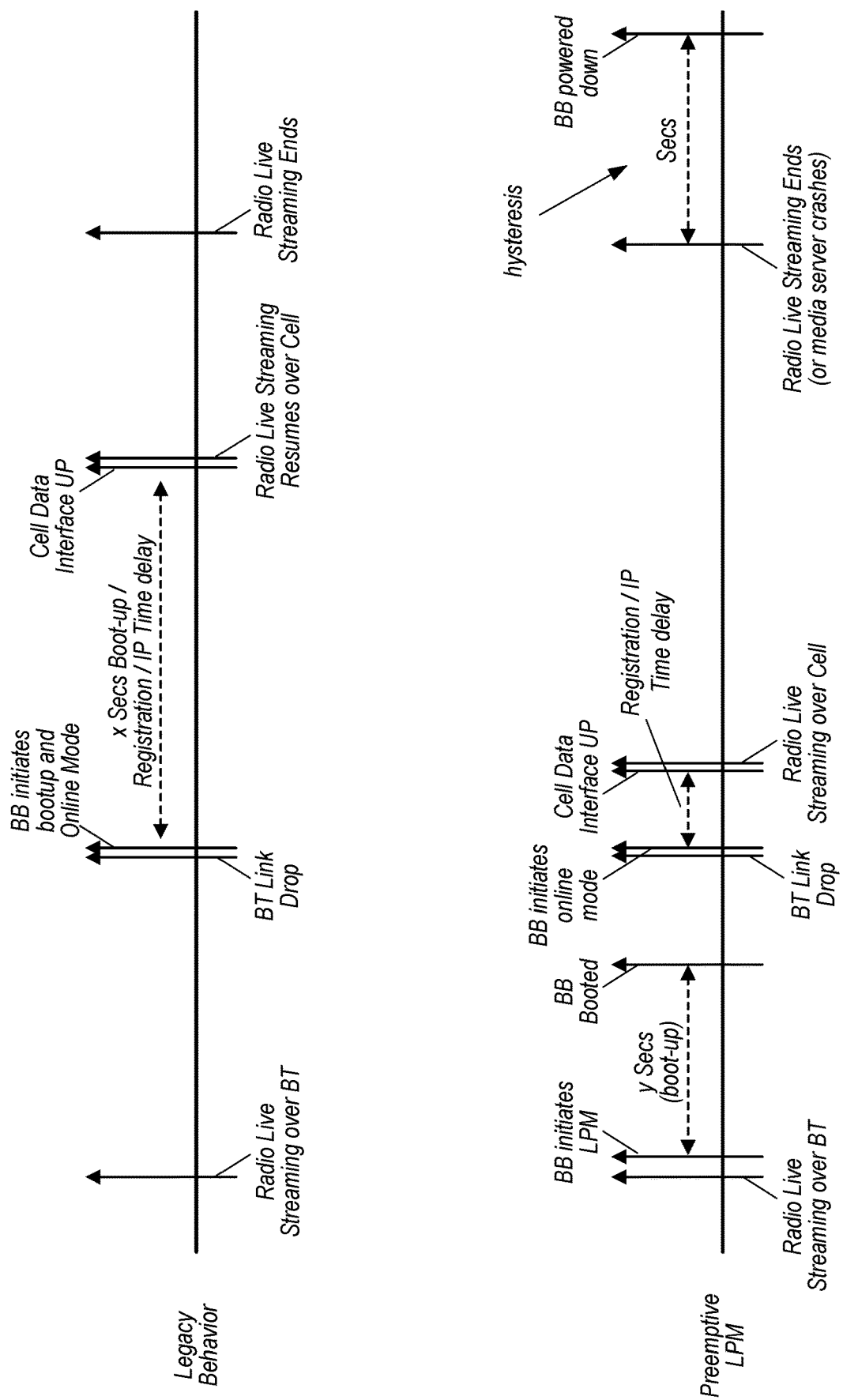
FIG. 6 is a timeline diagram illustrating each of a legacy method (top) for resuming a radio live stream over cellular, and a preemptive LPM implementation (bottom) for radio live streaming, according to some embodiments.

FIG. 6—Timeline for Radio Streaming

FIG. 6 is a timeline diagram illustrating each of a legacy method (top) for resuming a radio live stream over cellular, and a preemptive LPM implementation (bottom) for radio live streaming, according to some embodiments. As illustrated, in the legacy behavior (top), an AD performing radio live streaming over BT (e.g., using a companion as a proxy for performing cellular communications) may have the BT link dropped at the indicated time. Upon detecting that the BT link has been dropped, the AP may boot up its cellular baseband. After an approximately "x" second boot up, network registration, and IP time delay, the cellular data interface may be established and the radio live streaming may resume over a direct cellular connection by the AD.

In the illustrated embodiment employing preemptive LPM (bottom), the AD may initiate radio live streaming over BT (e.g., using a companion as a proxy for performing cellular communications), and may initiate LPM for the cellular radio (e.g., in response to one or more factors as described in detail above in reference to FIG. 5). As illustrated, the approximately "y" second bootup of the cellular baseband may be performed during the streaming session. After bootup is complete, the BT link dropped at the indicated time. In response, the AD may reestablish the radio live streaming session over its cellular radio in a reduced amount of time (since the cellular baseband is already booted up), thereby reducing the likelihood of an audio glitch that may adversely impact the user experience of the audio stream.

As illustrated, after the radio live streaming session ends (or the media application process crashes), the AD may wait a predetermined number of seconds before powering down the cellular BB to preserve power.

Figure 7:
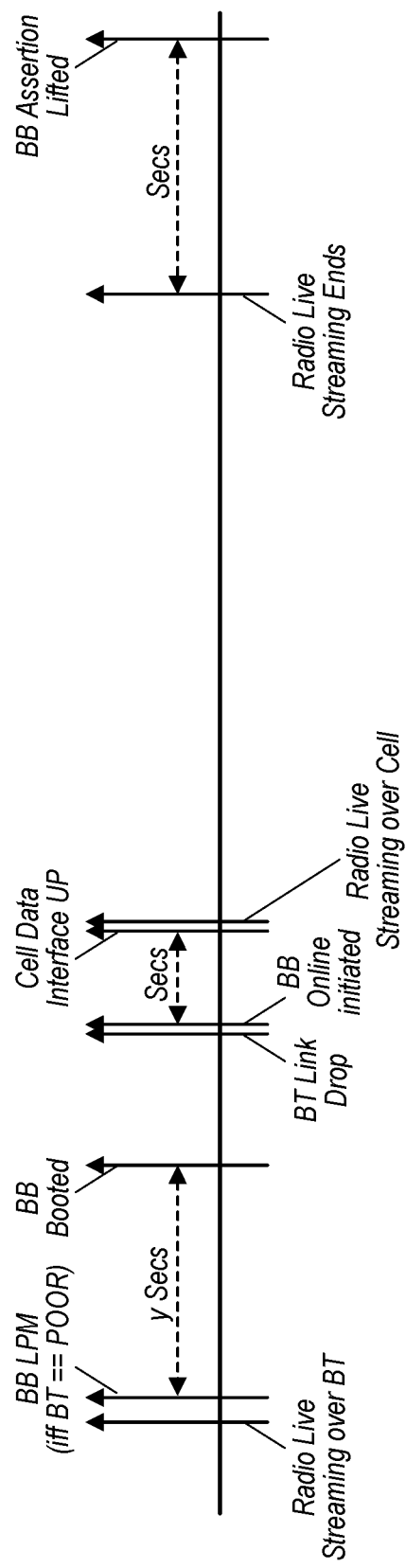
FIG. 7 is a timeline diagram illustrating a method for preemptive LPM implementation based on BT signal quality, according to some embodiments.

FIG. 7—Timeline for Radio Streaming Using BT Signal Quality

FIG. 7 is a timeline diagram illustrating a method for preemptive LPM implementation based on BT signal quality, according to some embodiments. The timeline illustrated in FIG. 7 is similar to the bottom timeline illustrated in FIG. 6, except that it is additionally illustrated how the transition of the cellular radio to LPM is performed only if it is determined that the BT link quality is poor (i.e., the signal strength is below a predetermined signal strength threshold, or another measure of signal quality is poor). The decision to implement LPM for the cellular radio may be additionally based on other factors, as variously described above in reference to FIG. 5. A poor signal strength of the BT link may make it more likely that a BT link drop occurs, thus increasing the probability that the transition to LPM results in a faster transition to cellular fallback of the streaming session.

Figure 8:
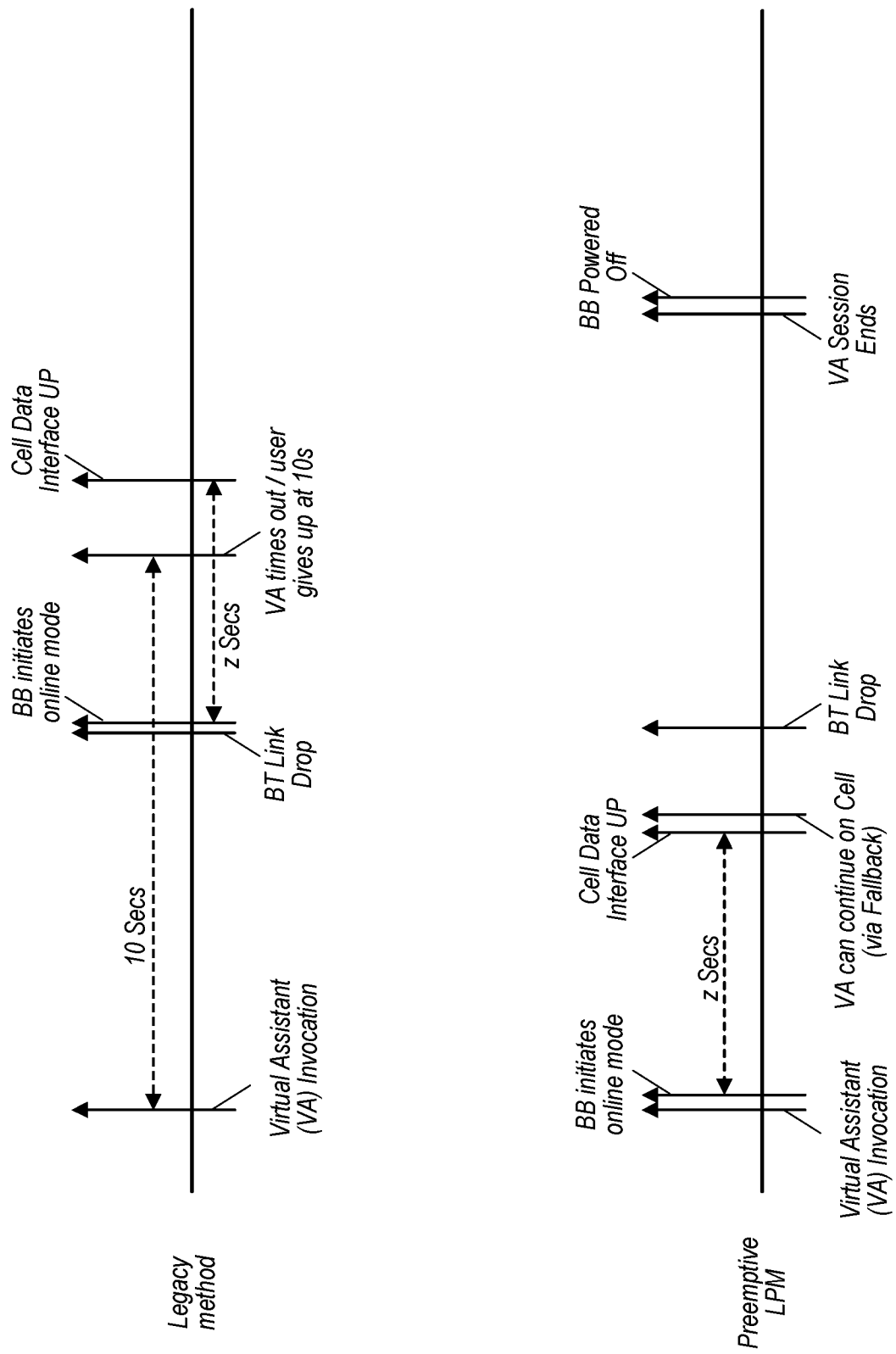
FIG. 8 is a timeline diagram illustrating each of a legacy method (top) for resuming virtual assistant data session over cellular, and a preemptive LPM implementation (bottom) for a virtual assistant data session, according to some embodiments.

FIG. 8—Timeline for Virtual Assistant Data Session

FIG. 8 is a timeline diagram illustrating each of a legacy method (top) for resuming virtual assistant data session over cellular, and a preemptive LPM implementation (bottom) for a virtual assistant data session, according to some embodiments. As illustrated, in the legacy behavior (top), an AD invokes a virtual assistant data session over BT (e.g., using a companion as a proxy for performing cellular communications). The virtual assistant data session may be configured to timeout if it is unresponsive after a predetermined period of time, or alternatively the user may give up waiting for a response after the predetermined period of time. If the BT link is dropped at an intermediate time as indicated, the AP may boot up its cellular baseband. However, the cellular data interface may not be online until after expiration of the predetermined period of time, resulting in a failure of the virtual assistant data session.

In the illustrated embodiment employing a preemptive online transition (bottom), the AD may initiate invocate a virtual assistant data session over BT (e.g., using a companion as a proxy for performing cellular communications), and may initiate the cellular radio to an online mode (e.g., in response to one or more factors as described in detail above in reference to FIG. 5). As illustrated, the approximately "z" seconds to activate the cellular data interface may be performed during the virtual assistant data session. After the cellular data interface is up and functional, the AD may continue the data session over its cellular radio via cellular fallback, even if the BT link with the companion device is dropped.

As illustrated, after the virtual assistant data session ends the AD may power down the cellular BB to preserve power.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An accessory device comprising:
 a first radio configured to communicate with a companion device using a non-cellular radio access technology (RAT);
 a second radio configured to communicate with a cellular network; and a processor coupled to the first radio and the second radio, wherein the processor is configured to operate with the first radio and the second radio to cause the accessory device to:
- establish a short-range wireless link with a companion device using the first radio;
- establish a first connection with the cellular network through the short-range wireless link with the companion device;
- initiate a first data session using the first connection;
- determine that a latency requirement associated with the first data session is shorter than a predetermined latency threshold;
- transition the second radio from a powered-off mode to a low power mode based at least in part on the determination that the latency requirement is shorter than the predetermined latency threshold, wherein transitioning the second radio from the powered-off mode to the low power mode includes powering on a baseband processor of the second radio without transitioning the second radio to an online radio mode;
- while the second radio is transitioned to low power mode, determine that the first connection has been lost;
- transition the second radio from the low power mode to the online radio mode based at least in part on the determination that the first connection has been lost; and
- reestablish the first connection with the cellular network using the second radio in the online radio mode.

2. The accessory device of claim 1, wherein said transitioning the second radio from the powered-off mode to the low power mode is further based on a determination that a signal strength of the first connection is below a signal strength threshold.

3. The accessory device of claim 1, wherein the predetermined latency threshold is based at least in part on a bootup time of the second radio.

4. The accessory device of claim 1, wherein the accessory device is further configured to:
- after the second radio has transitioned to the low power mode, determine that the first data session has been completed;
- wait a predetermined period of time after it is determined that the first data session has been completed; and
- transition the second radio from the low power mode back to the powered-off mode after expiration of the predetermined period of time.

5. The accessory device of claim 1, wherein said transitioning the second radio from the powered-off mode to the low power mode is further based on a determination that a remaining battery life of the accessory device is above a predetermined battery life threshold.

6. The accessory device of claim 1, wherein the first data session comprises an audio stream with an associated streaming buffer length, and wherein the latency requirement is determined based on the streaming buffer length.

7. The accessory device of claim 1, wherein the first data session comprises a plurality of audio streams, wherein each of the plurality of audio streams has a respective streaming buffer length, and wherein the latency requirement is determined based on a shortest buffering time of the plurality of streaming buffer lengths.

8. The accessory device of claim 1, wherein the accessory device is further configured to:
- determine that the first data session comprises a virtual assistant data session; and
- transition the second radio from the low power mode to an online radio mode based at least in part on the determination that the first data session comprises the virtual assistant data session.

9. A method for operating an accessory device, wherein the accessory device comprises a first radio configured to communicate with a companion device using a non-cellular radio access technology (RAT) and second radio configured to communicate with a cellular network, the method comprising, by the accessory device:
- establishing a short-range wireless link with the companion device using the first radio;
- establishing a first connection with a cellular network through the short-range wireless link with the companion device;
- initiating a first data session using the first connection;
- determining that a latency requirement associated with the first data session is shorter than a predetermined latency threshold; and
- transitioning the second radio from a powered-off mode to a low power mode based at least in part on the determination that the latency requirement is shorter than the predetermined latency threshold, wherein transitioning the second radio from the powered-off mode to the low power mode includes powering on a baseband processor of the second radio without transitioning the second radio to an online radio mode;
- while the second radio is transitioned to low power mode, determining that the first connection has been lost;
- transitioning the second radio from the low power mode to the online radio mode based at least in part on the determination that the first connection has been lost; and
- reestablishing the first connection with the cellular network using the second radio in the online radio mode.

10. The method of claim 9, wherein said transitioning the second radio from the powered-off mode to the low power mode is further based on a determination that a signal strength of the first connection is below a signal strength threshold.

11. The method of claim 9, the method further comprising:
- after the second radio has transitioned to the low power mode, determining that the first data session has been completed; and
- transitioning the second radio back from the low power mode to the powered-off mode based at least in part on the determination that the first data session has been completed.

12. The method of claim 9, wherein the first data session comprises an audio stream with an associated streaming buffer length, and wherein the latency requirement is determined based on the streaming buffer length.

13. The method of claim 9, the method further comprising:
- determining a power budget consumed by the second radio in the lower power mode, wherein said transitioning the second radio from the powered-off mode to the low power mode is further based at least in part on a determination that the power budget consumed by the second radio in the low power mode is less than a power budget threshold.

14. The method of claim 9,
wherein the predetermined latency threshold is based at least in part on a bootup time of the second radio.

15. An apparatus, comprising:
one or more processors coupled to a first radio of an accessory device configured to communicate with a companion device using a non-cellular radio access technology (RAT) and a second radio of the accessory device configured to communicate with a cellular network, wherein the one or more processors are configured to cause the accessory device to:
establish a short-range wireless link with a companion device using the first radio;
establish a first connection with the cellular network through the short-range wireless link with the companion device;
initiate a first data session using the first connection;
determine that a latency requirement associated with the first data session is shorter than a predetermined latency threshold;
transition the second radio from a powered-off mode to a powered-on mode based at least in part on the determination that the latency requirement is shorter than the predetermined latency threshold, wherein transitioning the second radio from the powered-off mode to the powered-on mode includes powering on a baseband processor of the second radio without transitioning the second radio to an online radio mode, and wherein the powered-on mode comprises an enhanced low power mode;
while the second radio is transitioned to powered-on mode, determine that the first connection has been lost;
transition the second radio from the powered-on mode to the online radio mode based at least in part on the determination that the first connection has been lost; and
reestablish the first connection with the cellular network using the second radio in the online radio mode.

16. The apparatus of claim 15,
wherein the first data session comprises a data streaming session.

17. The apparatus of claim 15,
wherein the apparatus is further configured to periodically transition the first radio to a full online mode to register with the network while in the enhanced low power mode.

18. The apparatus of claim 15,
wherein said transitioning the second radio from the powered-off mode to the powered-on mode is further based on a determination that a signal strength of the first connection is below a signal strength threshold.

19. The apparatus of claim 15,
wherein the first data session comprises a virtual assistant data session.

20. The apparatus of claim 15,
wherein the predetermined latency threshold is based at least in part on a bootup time of the second radio.

* * * * *